US006934449B2

(12) United States Patent
Uekawa et al.

(10) Patent No.: US 6,934,449 B2
(45) Date of Patent: Aug. 23, 2005

(54) OPTICAL DEVICE PERMITTING PASSIVE ALIGNMENT OF LENS ELEMENT

(75) Inventors: Masahiro Uekawa, Kanagawa (JP); Hironori Sasaki, Yamanashi (JP); Takeshi Takamori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 293 days.

(21) Appl. No.: 09/918,829

(22) Filed: Aug. 1, 2001

(65) Prior Publication Data

US 2002/0031308 A1 Mar. 14, 2002

(30) Foreign Application Priority Data

Sep. 11, 2000 (JP) ........................................ 2000-274253

(51) Int. Cl.[7] .............................................. G02B 6/26
(52) U.S. Cl. ...................................................... 385/52
(58) Field of Search ............................. 385/52, 14, 35, 385/49, 50, 89, 31, 33, 93, 34, 59, 61, 65, 71, 74, 83, 84, 88

(56) References Cited

U.S. PATENT DOCUMENTS

| | | | | |
|---|---|---|---|---|
| 5,257,332 A | * | 10/1993 | Pimpinella | ................... 385/59 |
| 5,481,629 A | * | 1/1996 | Tabuchi | ........................ 385/14 |
| 5,543,255 A | * | 8/1996 | Ham | .............................. 430/5 |
| 5,625,493 A | * | 4/1997 | Matsumura | .................. 359/630 |
| 5,985,185 A | | 11/1999 | Steijer et al. | |
| 6,083,843 A | | 7/2000 | Ohja et al. | |
| 6,085,007 A | | 7/2000 | Jiang et al. | |
| 6,272,272 B1 | * | 8/2001 | Ford | ........................... 385/52 |

OTHER PUBLICATIONS

"High Optical Coupling Scheme in LD Modules with Silicon Platform Technology", IEICE Transactions on Electronics, vol. E80–C, No. 1, Jan. 1997, pp. 107–111.

* cited by examiner

*Primary Examiner*—J. F. Duverne
(74) *Attorney, Agent, or Firm*—Wenderoth, Lind & Ponack, L.L.P.

(57) ABSTRACT

An optical device includes an optical substrate having a first surface on which a lens element is formed, and a second surface with a projecting part or parts. The projecting part or parts are mated with a corresponding groove or grooves in the surface of a supporting substrate on which an optical element is mounted. The optical element is thereby optically aligned with the lens element. The projecting part or parts and groove or grooves are preferably formed by photolithography.

16 Claims, 4 Drawing Sheets

OPTICAL DEVICE PERMITTING PASSIVE ALIGNMENT OF LENS ELEMENT

BACKGROUND OF THE INVENTION

The present invention relates to an optical device in which a lens element such as a computer-generated hologram is optically coupled to another optical element. More particularly, it relates to a device in which the alignment of the lens element and the other optical element is simplified.

Known alignment methods include passive methods such as the one disclosed by Tanaka et al. in IEICE Transactions on Electronics, Vol. E80-C, No. 1 (January 1997), pp. 107–111. This method aligns an optical fiber with a laser diode chip by mounting both of them on a supporting substrate referred to as a silicon platform. Photolithographic techniques are used to form a V-groove and fiducial marks simultaneously on the silicon platform. The optical fiber is mounted in the V-groove, the depth of which controls vertical alignment. The laser diode chip is mounted on a solder pad on the silicon platform and positioned in relation to the fiducial marks, which control horizontal alignment. Because of the high accuracy of photolithography, the laser diode chip can be positioned with sufficient precision to couple the emitted laser beam, which has a typical diameter of one to six micrometers (1–6 µm), into the optical fiber within an alignment tolerance of one to two micrometers (1–2 µm).

It would be desirable to extend this passive alignment technique to optical devices that also include lens elements such as a computer-generated holograms (CGH elements), which must be formed on a separate optical substrate. CGH elements are extremely useful, because they can be finely and accurately patterned by the same techniques of photolithography and etching as used to fabricate semiconductor electronic circuits, and because by suitable combinations of etching masks, they can be given not only lens functions such as focusing and collimating, but also prism functions such as deflection.

Accurate alignment of a CGH element formed in an optical substrate with an optical element mounted on a silicon substrate requires precise relative positioning of the two substrates. The required precision is conventionally achieved by active alignment techniques, such as by moving the optical substrate in relation to the silicon substrate while transmitting test light from the optical element, and measuring the amount of light that is coupled through the CGH element. Active alignment, however, has the disadvantages of taking time and requiring expensive test equipment.

SUMMARY OF THE INVENTION

An object of the present invention is to simplify the alignment of a lens element such as a CGH element with an optically coupled element disposed on a separate substrate.

The invented optical device includes an optical substrate and a supporting substrate. The optical substrate has a first surface on which a lens element is formed, and a second surface on which a projecting part is disposed. The supporting substrate supports an optical element, and has a grooved surface with a groove in which the projecting part of the optical substrate rests. The optical substrate and supporting substrate are positioned in relation to one another by mating the projecting part with this groove. When they are positioned in this way, the lens element formed in the optical substrate is aligned with the optical element supported by the supporting substrate.

The projecting part and groove are preferably defined by photolithography.

A pair of projecting parts may be provided on the optical substrate, and a pair of grooves may be provided on the supporting substrate, to assure accurate positioning.

Alignment of the optical element with the lens element by mating the projecting parts with the grooves is simple, quick, and accurate.

DETAILED DESCRIPTION OF THE INVENTION

Figure 1:
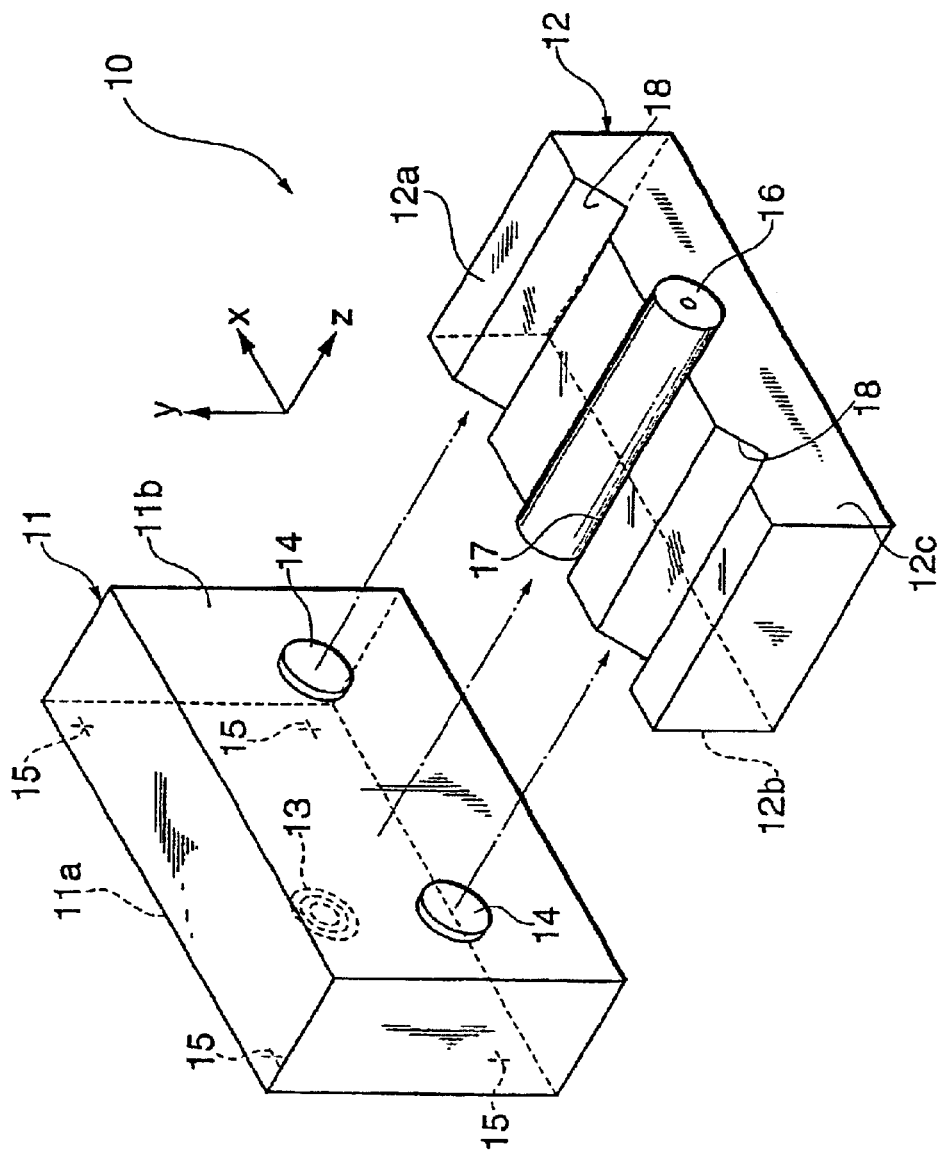
FIGS. 1, 2, 3, and 4 are exploded perspective drawings of optical devices embodying the invention.

Embodiments of the invention will be described with reference to the attached drawings, in which like elements are indicated by like reference characters.

A first embodiment is an optical device 10 comprising an optical substrate 11 and a supporting substrate 12 with a grooved surface 12a as shown in FIG. 1.

The optical substrate 11 is a quartz substrate with a thickness in a range of, for example, five hundred to five thousand micrometers (500 µm to 5000 µm), and preferably of one thousand to three thousand micrometers (1000 µm to 3000 µm). A lens element, such as a CGH element, 13 is formed on a first surface 11a of the optical substrate 11. A pair of projecting parts 14 are formed on a second surface 11b of the optical substrate 11. The first surface 11a and second surface 11b are mutually opposite and parallel to one another.

The CGH element 13 is formed by photolithography and etching, using mask patterns generated by a computer on the basis of desired optical diffraction characteristics. These characteristics can be chosen to give the CGH element 13 one or more of several different optical functions, such as focusing, collimating, deflection, and the like. The design and fabrication of such CGH elements is a well-known art. The diameter of the CGH element 13 is in a range of, for example, fifty to one thousand micrometers (50 µm to 1000 µm), and preferably of one hundred to eight hundred micrometers (100 µm to 800 µm).

The first surface 11a preferably also has alignment marks 15 that are formed together with the CGH element 13, to indicate the relative position of the CGH element. The CGH element 13 and these alignment marks 15 can be positioned on the surface 11a of the optical substrate 11 to within a tolerance of one micrometer (1 µm) or less by using photolithography and etching techniques that are well established for the fabrication of semiconductor devices.

The projecting parts 14 extend perpendicularly from the second surface 11b of the optical substrate 11 and have a circular cross-section with a diameter of, for example, one hundred twenty-five micrometers (125 µm). These parts 14 can be formed by photolithography as follows.

The entire second surface 11b of the optical substrate 11 is coated with a layer of a photosensitive resin, such as an ultraviolet-curable epoxy resin. The resin layer has a substantially uniform thickness in a range of, for example, ten to five hundred micrometers (10 µm to 500 µm), and preferably in a range of fifty to two hundred micrometers (50 µm to 200 µm). This layer is selectively exposed to ultraviolet light through an exposure mask, not shown in the drawings, that defines the shapes of the projecting parts 14.

The exposed parts of the resin layer cure (harden). The unexposed and therefore uncured parts are dissolved or etched by application of a solvent or etchant, exposing the second surface 11b except for two remaining discs of hardened resin, which form the projecting parts 14.

The exposure mask used in this photolithography process is preferably aligned in relation to the marks 15 formed on the first surface 11a when the CGH element 13 was formed. In this way, the projecting parts 14 can be positioned in relation to the CGH element 13 with high accuracy, to within a tolerance of one micrometer (1 μm) or less.

The optical element optically coupled to the CGH element 13 is an optical fiber 16 mounted in a V-groove 17 in the grooved surface 12a of the supporting substrate 12. The optical fiber 16 has a circular cross section with a diameter of, for example, one hundred twenty-five micrometers (125 μm). The supporting substrate 12 is, for example, a crystalline silicon substrate, and such substrates are well known. The V-groove 17 can be fabricated with high precision in this type of substrate by conventional photolithography and etching techniques, using an etching mask not shown in the drawings. In particular, an anisotropic etchant can be employed to obtain a very precise V-shaped cross section, aligned with particular crystal lattice planes.

The V-groove 17 is parallel on the grooved surface 12a of the supporting substrate 12 to two other etched grooves 18, which are also V-shaped. All three grooves 17, 18 extend from the front side 12b of the supporting substrate 12 (the side adjacent the optical substrate 11) to the opposite (rear) side 12c. The etched grooves 18 are preferably formed together with the V-groove 17 in a single photolithography and etching process, so that they are precisely positioned in relation to the V-groove 17.

When the optical device 10 in FIG. 1 is assembled, the second surface 11b of the optical substrate 11 is brought into contact with the front side 12b of the supporting substrate 12 and is positioned so that the two projecting parts 14 rest in the open ends of the two etched grooves 18. The optical substrate 11 and supporting substrate 12 are then held in this position by attaching the optical substrate 11 to the supporting substrate 12 with an adhesive, for example, so that the projecting parts 14 fit snugly into the ends of the etched grooves 18.

Since the projecting parts 14 are positioned accurately in relation to the CGH element 13, and rest in the etched grooves 18, which are positioned accurately in relation to the V-groove 17, and since the optical fiber 16 rests in the V-groove 17, the optical fiber 16 is positioned accurately in relation to the CGH element 13. In particular, the optic axes of the optical fiber 16 and CGH element 13 are aligned with high precision, so that the CGH element 13 and optical fiber 16 are optically coupled.

With conventional methods, accurate alignment of the optic axes of the CGH element 13 and optical fiber 16 would require an active alignment process as described above, involving the transmission and measurement of test light while moving the optical substrate 11 and supporting substrate 12 in relation to one another. Needless to say, the alignment method shown in FIG. 1, which involves only the mating of the projecting parts 14 with the etched grooves 18, is much simpler.

The inventors have found that in the optical device 10 in FIG. 1, the optical fiber 16 can be positioned in relation to the CGH element 13 to within a tolerance of one micrometer (1 μm) or less in the x-, y-, and z-directions indicated in the drawing, with an angular axial alignment error not exceeding 0.19 degrees, which is small enough to be substantially negligible. Thus with the optical device 10 in FIG. 1, alignment is simple, quick, and highly accurate.

In a variation of the first embodiment, the projecting parts 14 are unitary (one-piece) with the optical substrate 11. Instead of being formed from a photosensitive resin, the projecting parts 14 are formed by patterning the second surface 11b of the optical substrate 11 itself, using photolithography and etching techniques that leave the projecting parts 14 intact and remove the surrounding substrate material to a certain depth. Specifically, two discs of photoresist are formed as described above. Then, the surface 11b of the substrate 11 is etched except where protected by the two discs, after which etching process the discs are removed. The same high positional accuracy as above is achieved.

It is also possible for the optical substrate 11 to be a silicon substrate instead of a quartz substrate. The above variation is particularly suitable in that case, because silicon can be etched with high precision, using an etching gas of the chlorine or fluorine family. The above variation is less suitable when the optical substrate 11 is a quartz substrate, because quartz is more difficult to etch. Silicon is thus an advantageous material for the optical substrate 11, in that it permits accurately fabricated projecting parts 14 to be unitary (one-piece) with the optical substrate.

Figure 2:
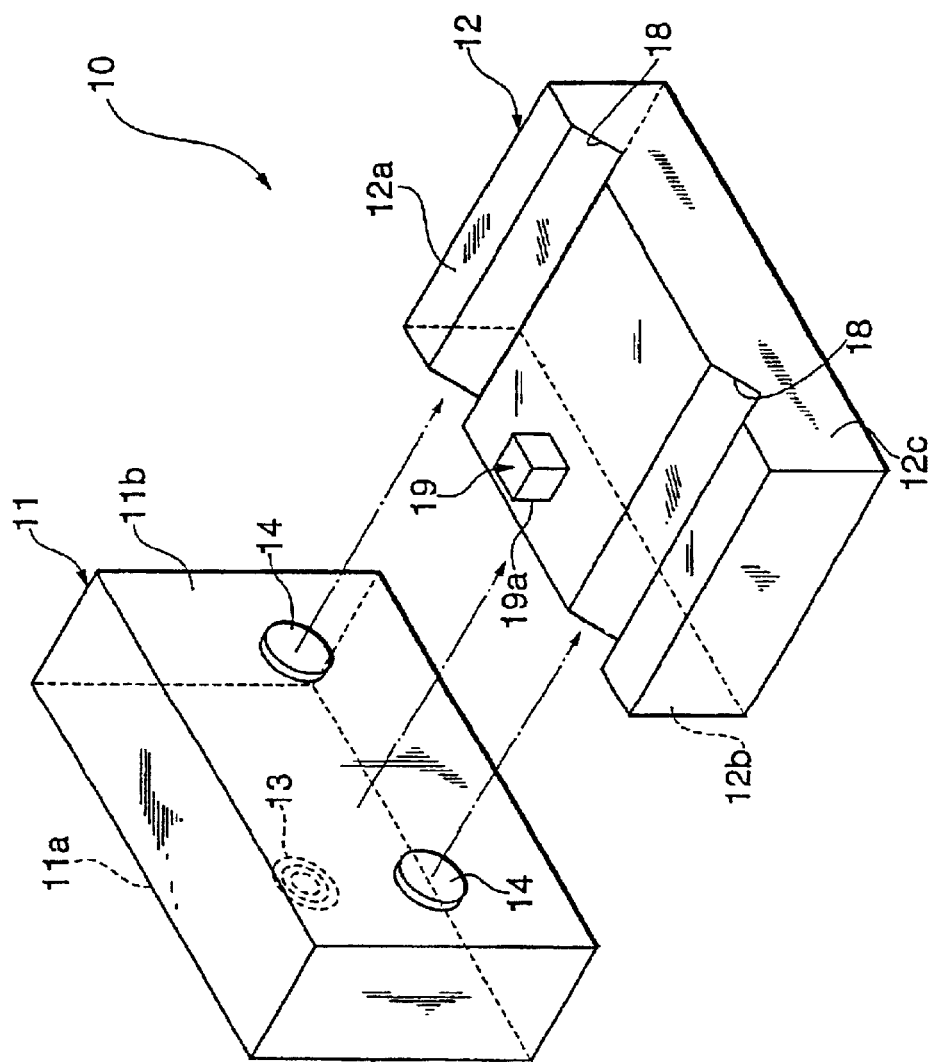

The second embodiment is the optical device 10 shown in FIG. 2, which is identical to the optical device 10 in FIG. 1 except that there are only two etched grooves 18 in the grooved surface 12a of the supporting substrate 12, and the optical element is a laser diode 19 that emits light toward the CGH element 13. The laser diode 19 is a well-known opto-electronic device fabricated as a semiconductor chip, and is attached to a solder pad (not visible) on the grooved surface 12a of the supporting substrate 12, its emitting facet 19a aligned parallel to the front side 12b of the supporting substrate 12.

The above-mentioned solder pad is formed on the grooved surface 12a of the supporting substrate 12, using well-known and highly accurate techniques also used in the fabrication of semiconductor devices. The positions of both the solder pad and the etched grooves 18 are defined by photolithography, so they are positioned accurately relative to each other on the grooved surface 12a.

As a result, when the optical device is assembled as indicated by the arrows in FIG. 2, the laser diode 19 is positioned accurately in relation to the CGH element 13, and their optical axes are mutually aligned with high precision. Light emitted from the laser diode 19 is thus coupled accurately to the CGH element 13.

In a variation of the second embodiment, the laser diode 19 is replaced by a photodiode or phototransistor that receives light transmitted through the CGH element 13, or by any other type of element that is optically coupled with the CGH element 13 and can be mounted on the grooved surface 12a of the supporting substrate 12 in a manner similar to the laser diode 19.

Figure 3:
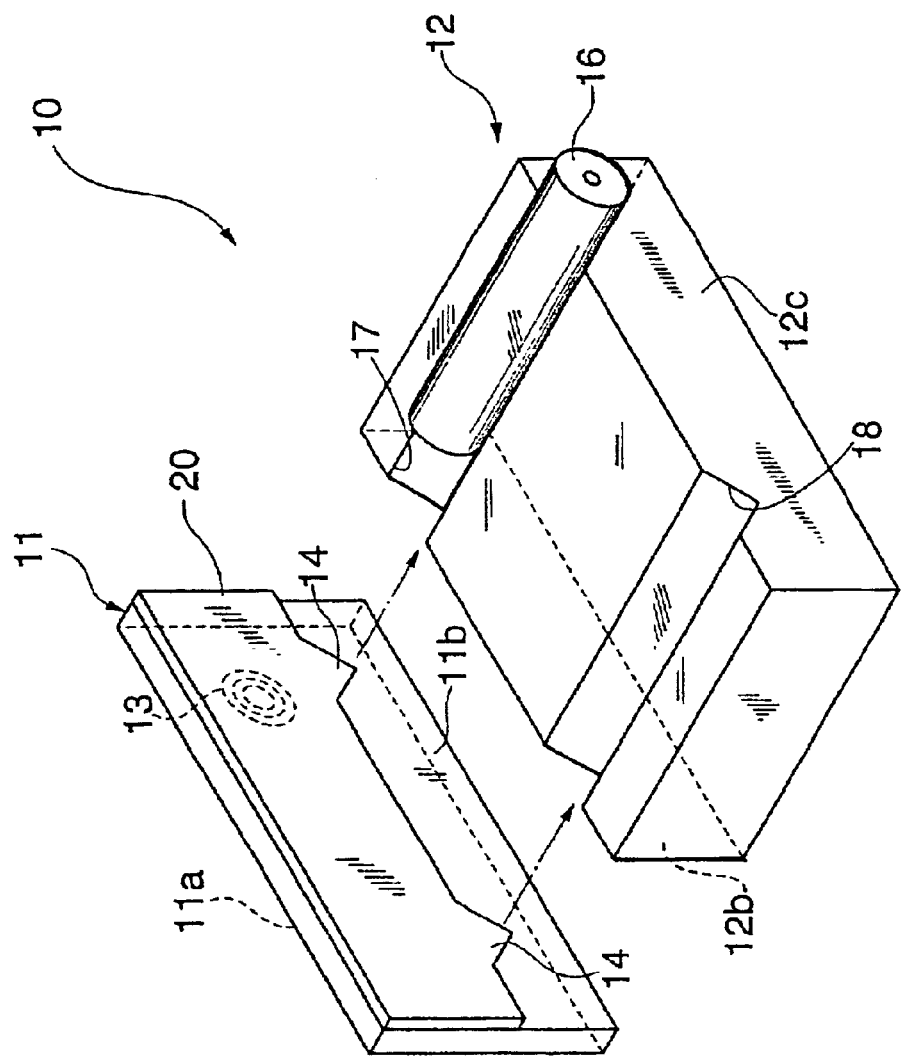

The third embodiment is the optical device 10 shown in FIG. 3, in which the V-groove 17 that holds the optical fiber 16 is positioned to mate with one of the projecting parts 14 on the second surface 11 b of the optical substrate 11. These projecting parts 14 are now triangular in shape, with their apexes pointing down.

The projecting parts 14 are part of an ultraviolet-cured epoxy resin layer 20 that partially covers the second surface 11b of the optical substrate 11. The epoxy resin layer 20 is transparent and does not prevent light propagation between the CGH element 13 and optical fiber 16. The projecting parts 14 are triangular extensions of one edge of the epoxy resin layer 20.

An etched groove 18 is formed on the grooved surface 12a of the supporting substrate 12, parallel to the V-groove 17. Both the V-groove 17 and this etched groove 18 have triangular cross-sections. The triangular shapes of the projecting parts 14 correspond to the cross-sectional shapes of the V-groove 17 and etched groove 18, which are positioned to mate with the projecting parts 14.

The epoxy resin layer 20 and projecting parts 14 can be formed as described in the first embodiment, by photolithography. That is, they can be formed by coating the second surface 11b of the optical substrate 11 with a uniform layer of ultraviolet-curable epoxy resin, selectively exposing the layer to ultraviolet light through a mask (not visible) to cure the exposed part of the layer, and removing the unexposed and thus uncured part.

The optical fiber 16 is disposed in a somewhat withdrawn position in the V-groove 17, so that there is sufficient free space between the front end of the optical fiber 16 and the front side 12b of the supporting substrate 12 to allow the V-groove 17 to accommodate a corresponding one of the projecting parts 14. The CGH element 13 formed on the first surface 11a of the optical substrate 11 is disposed in a position to receive the light emitted from the optical fiber 16.

As in the preceding embodiments, the CGH element 13 is accurately positioned in relation to the projecting parts 14, which mate with the V-groove 17 and etched groove 18, and the optical fiber 16 is held in the V-groove 17, which is accurately positioned in relation to the etched groove 18. Therefore, the CGH element 13 is accurately positioned in relation to the optical fiber 16, and their optic axes are accurately aligned.

In a variation of the third embodiment, the projecting parts 14 are semicircular in cross-section, or have some other non-triangular cross-sectional shape still suitable for mating with the V-groove 17 and etched groove 18.

Figure 4:
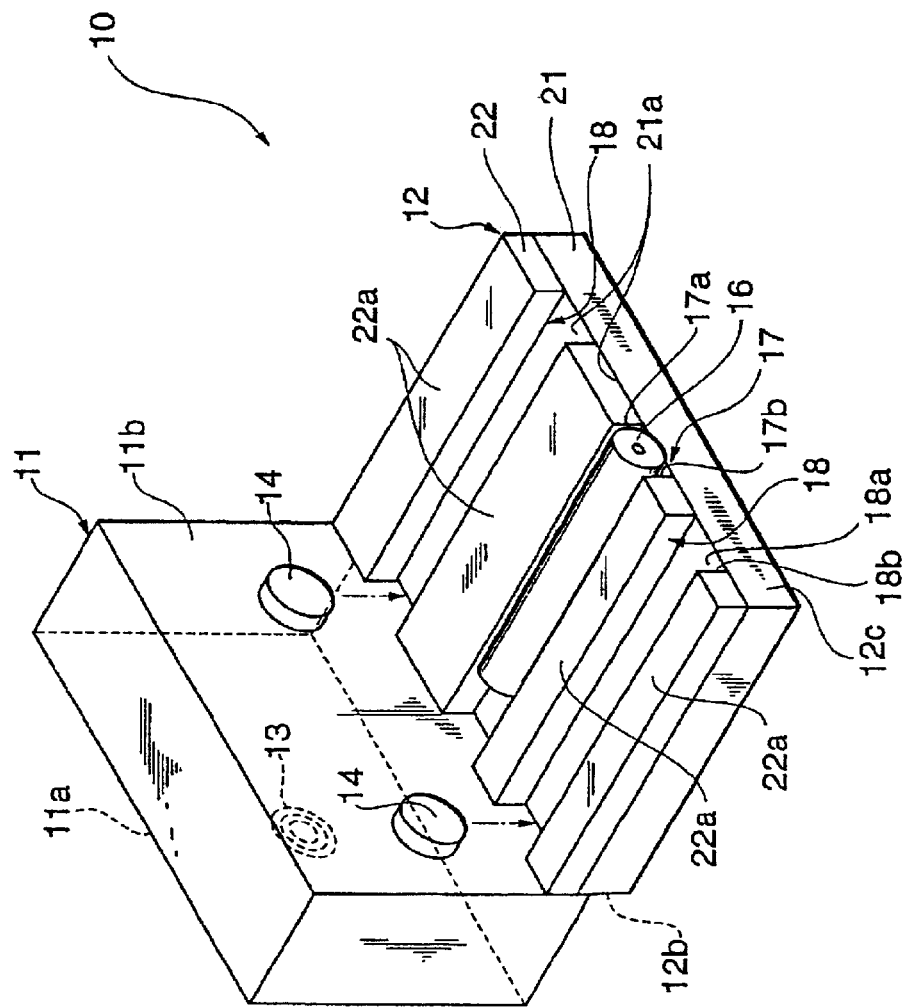

The fourth embodiment of the invention is the optical device 10 shown in FIG. 4, in which the supporting substrate 12 comprises a polymer substrate 21, such as a polyethylene terephthalate (PET) substrate, and a grooved epoxy resin layer 22. The grooved epoxy resin layer 22 is formed on the upper surface 21a of the polymer substrate 21, and comprises bands 22a extending from the front side 12b of the supporting substrate 12 to the opposite edge 12c. The spaces between the bands 22a form a groove 17 that holds an optical fiber 16, and a pair of grooves 18 that accommodate the projecting parts 14 of the optical substrate 11.

The bands 22a and grooves 17, 18 are formed by photolithography. Specifically, the bands are formed by coating the upper surface 21a of the polymer substrate 21 with a substantially uniform layer of photosensitive epoxy resin, exposing this layer to ultraviolet light through an exposure mask (not visible) to cure the exposed parts (the bands 22a), and removing the unexposed and therefore uncured parts.

In FIG. 4, the grooves 17, 18 are substantially U-shaped, with floors (bottom surfaces) 17a, 18a formed by the upper surface 21 a of the polymer substrate 21, and sides 17b, 18b defined by the exposure mask during the photolithography process. The widths of the U-shaped grooves 17, 18 should be adequate to seat the optical fiber 16 and projecting parts 14, but do not necessarily have to be equal to the outer diameters of the optical fiber 16 and projecting parts 14. The width of groove 17 should be equal to or less than the diameter of the optical fiber 16, and the width of grooves 18 should be equal to or less than the diameter of the projecting parts 14.

The fourth embodiment provides substantially the same effect as the preceding embodiments.

In a variation of the fourth embodiment, the grooves 17, 18 are V-shaped instead of U-shaped, or have some other shape suitable for accommodating the optical fiber 16 and projecting parts 14.

The polymer substrate 21 need not be a PET substrate, and another polymer material can be used. Materials other than polymers can also be used for this substrate.

Any of the preceding embodiments can be varied by replacing the CGH element 13 with another type of lens element, such as a bulk lens of either the spherical or aspherical type.

A plurality of lens elements may be formed in the optical substrate 11, optically coupled to a corresponding plurality of optical elements mounted on the supporting substrate 12.

Those skilled in the art will recognize that further variations are possible within the scope claimed below.

What is claimed is:

1. An optical device comprising:
   a quartz substrate;
   a projecting part formed of a photosensitive resin material cured by exposure to light, said projecting part being attached to said quartz substrate;
   a lens element formed on said quartz substrate;
   an optical element; and
   a supporting substrate supporting said optical element, said supporting substrate having a grooved surface with a groove formed therein;
   wherein said projecting part attached to said quartz substrate rests within said groove formed in said grooved surface of said supporting substrate so as to align said lens element with said optical element.

2. A method of fabricating the optical element of claim 1, comprising:
   using photolithography to define said projecting part; and
   using photolithography to define said groove formed in said grooved surface of said supporting substrate.

3. The optical device of claim 1, wherein said groove formed in said grooved surface comprises a first groove, said supporting substrate having a second groove formed in said grooved surface, said projecting part of said guartz substrate comprising a first projecting part, said optical substrate having a second projecting part resting within said second groove so as to align said lens element and said optical element.

4. The optical device of claim 3, wherein said supporting substrate has a third groove formed in said grooved surface parallel to said first groove and said second groove, said optical element comprising an optical fiber arranged in said third groove.

5. The optical device of claim 1, wherein said supporting substrate has a side adjacent to said quartz substrate, said groove formed in said grooved surface extending to said side.

6. The optical device of claim 5, wherein said groove formed in said grooved surface comprises a first groove, said supporting substrate having a second groove formed in said grooved surface parallel to said first groove and extending to said side, said optical element comprising an optical fiber arranged in said second groove.

7. The optical device of claim 5, wherein said groove formed in said grooved surface comprises a first groove, said supporting substrate having a second groove and a third groove formed in said grooved surface, both said second groove and said third groove being formed parallel to said first groove and extending to said side, said projecting part of said quartz substrate comprising a first projecting part, said quartz substrate having a second projecting part resting within said second groove, and said optical element comprising an optical fiber arranged in said third groove.

8. The optical device of claim 1, wherein said supporting substrate is crystalline, and said groove formed in said grooved surface of said supporting substrate has a V-shaped cross section.

9. A method of forming the optical device of claim 8, comprising forming said grooved surface of said supporting substrate by etching said supporting substrate using an anisotropic etchant.

10. The optical device of claim 1, wherein said supporting substrate comprises:
  a polymer substrate; and
  a grooved resin layer arranged on said polymer substrate so as to form said grooved surface of said supporting substrate.

11. A method of forming an optical device, comprising:
  coating a polymer substrate with a photosensitive resin layer;
  selectively exposing said photosensitive resin layer to light through an exposure mask so as to cure exposed portions of said photosensitive resin layer;
  removing uncured portions of said photosensitive resin layer so as to form a groove in said resin layer;
  mounting an optical element on said polymer substrate;
  forming a lens element on an optical substrate;
  forming a projecting part on said optical substrate; and
  connecting said optical substrate to said polymer substrate so that said projecting part rests within said groove, thereby aligning said lens element with said optical element.

12. The optical device of claim 1, wherein said projecting part extends perpendicularly from a surface of said quartz substrate and has a circular cross-section.

13. A method of forming an optical device, comprising:
  forming a lens element on a quartz substrate;
  coating said quartz substrate with a photosensitive resin layer;
  selectively exposing said photosensitive resin layer to light through an exposure mask so as to cure exposed portions of said photosensitive resin layer;
  removing uncured portions of said photosensitive resin layer so as to leave cured portions of said photosensitive resin layer as a projecting part;
  forming a supporting substrate having a grooved surface with a groove formed therein;
  mounting an optical element on said supporting substrate; and
  connecting said quartz substrate to said supporting substrate so that said projecting part rests within said groove, thereby aligning said lens element with said optical element.

14. The optical device of claim 1, wherein said lens element comprises a computer-generated hologram.

15. The optical device of claim 1, wherein said lens element is fixed to said quartz substrate.

16. The optical device of claim 15, wherein said quartz substrate and said lens element are integrated to form a one-piece unit.

* * * * *